(12) United States Patent
Bratthaell et al.

(10) Patent No.: US 9,461,517 B2
(45) Date of Patent: Oct. 4, 2016

(54) ELECTRICAL MOTOR FOR A SUBMERSIBLE MACHINE

(75) Inventors: Johan Bratthaell, Saltsjoe Boo (SE); Ruben Martinez, Baelsta (SE); Joergen Nilsson, Solna (SE); Oystein Krogen, Straengnaes (SE)

(73) Assignee: XYLEM HOLDINGS LLC, White Plains, NY (US)

( * ) Notice: Subject to any disclaimer, the term of this patent is extended or adjusted under 35 U.S.C. 154(b) by 226 days.

(21) Appl. No.: 14/117,168

(22) PCT Filed: May 14, 2012

(86) PCT No.: PCT/SE2012/050507
§ 371 (c)(1),
(2), (4) Date: Nov. 12, 2013

(87) PCT Pub. No.: WO2012/158103
PCT Pub. Date: Nov. 22, 2012

(65) Prior Publication Data
US 2015/0171697 A1    Jun. 18, 2015

(30) Foreign Application Priority Data
May 17, 2011 (SE) ...................... 1150449

(51) Int. Cl.
*H02K 15/16* (2006.01)
*H02K 5/132* (2006.01)
(Continued)

(52) U.S. Cl.
CPC ............... *H02K 5/10* (2013.01); *H02K 15/03* (2013.01); *H02K 15/16* (2013.01); *H02K 5/132* (2013.01)

(58) Field of Classification Search
CPC ...... H02K 1/27; H02K 1/278; H02K 1/2786; H02K 1/30; H02K 5/03; H02K 5/10; H02K 15/03; H02K 15/16; H02K 5/132
USPC ............ 310/156.12, 156.13, 156.18, 156.19, 310/156.21, 156.22, 156.23, 156.28, 310/156.29, 156.81, 16.82, 87, 88, 68 E, 310/68 B, 68 R, 43, 156.31, 261.1, 271, 417, 310/254.1; 29/596
See application file for complete search history.

(56) References Cited

U.S. PATENT DOCUMENTS 2,440,897 A * 5/1948 Hammarstrom ......... F16M 5/00
248/676
3,707,038 A * 12/1972 Hallerback ............ H02K 15/16
29/593

(Continued)

FOREIGN PATENT DOCUMENTS

DE    102006022362 A1    11/2007
JP    61-142950    *    6/1986

(Continued)

OTHER PUBLICATIONS

English translation for JP 61-180554.*

(Continued)

*Primary Examiner* — Terrance Kenerly
*Assistant Examiner* — Ahmed Elnakib
(74) *Attorney, Agent, or Firm* — RatnerPrestia

(57) ABSTRACT

An electrical motor for a submersible machine, including a stator unit having a stator core and a rotor unit that is rotatably arranged in the stator unit. The rotor unit includes a rotor core and at least one permanent magnet. The rotor core has an outer diameter that is smaller than an inner diameter of the stator core. The rotor unit includes a brake, the radially outer surface of which is inscribed on a circle having a diameter that is greater than the outer diameter of the rotor core. At least a part of the brake is arranged to abut against an inner surface of the stator core upon mutual axial displacement of the rotor unit and the stator unit. The brake is spaced-apart from the stator core when the rotor unit is in the mounted state in the stator unit.

8 Claims, 6 Drawing Sheets

(51) Int. Cl.
*H02K 15/03* (2006.01)
*H02K 5/10* (2006.01)

(56) References Cited

U.S. PATENT DOCUMENTS

| | | | |
|---|---|---|---|
| 4,955,128 A * | 9/1990 | Sogabe | H02K 5/15 |
| | | | 29/213.1 |
| 6,484,389 B1 * | 11/2002 | Levin | H02K 7/006 |
| | | | 29/596 |
| 6,919,659 B2 | 7/2005 | Rapp | |
| 7,355,316 B2 * | 4/2008 | Yokota | B23D 45/16 |
| | | | 310/261.1 |
| 7,723,895 B2 * | 5/2010 | Poskie | H02K 15/16 |
| | | | 310/261.1 |
| 2006/0250044 A1 | 11/2006 | Yokota et al. | |
| 2007/0235248 A1 | 10/2007 | Matsubara et al. | |
| 2009/0189303 A1 * | 7/2009 | Diggins | B29D 11/00865 |
| | | | 264/1.38 |

FOREIGN PATENT DOCUMENTS

| | | | |
|---|---|---|---|
| JP | 61-180554 | * | 8/1986 |
| JP | 2006-115666 | * | 4/2006 |
| JP | 2006115666 | | 4/2006 |
| SE | 533338 C2 | | 8/2010 |
| WO | WO 2007/051895 A1 | | 5/2007 |
| WO | WO 2007/131889 A1 | | 11/2007 |

OTHER PUBLICATIONS

English translation of JP 2006115666; Apr. 2006; Yamamoto et al. Japan.*
English translation of JPS61180554; Aug. 1986; Tadashi et al. Japan.*
European Search Report, dated Oct. 14, 2014, corresponding to counterpart European Patent Application No. 12786553.3.
International Search Report, dated Aug. 20, 2012, corresponding to International Application No. PCT/SE2012/050507, filed May 14, 2012.

* cited by examiner

ELECTRICAL MOTOR FOR A SUBMERSIBLE MACHINE

CROSS-REFERENCE TO RELATED APPLICATIONS

This application is a U.S. National Phase Patent Application of PCT Application No. PCT/SE2012/050507, filed May 14, 2012, which claims priority to Swedish Patent Application No. SE1150449-5, filed May 17, 2011, each of which is incorporated by reference herein in its entirety.

TECHNICAL FIELD OF THE INVENTION

The present invention relates generally to the field of electrical motors for submersible machines, such as pumps and mixers suitable for, for instance, transporting and treating water or waste water. In particular, the present invention relates to an electrical motor for a submersible machine, the electrical motor comprising a stator unit having a stator core and a rotor unit that is rotatably arranged in said stator unit and has an axially extending centre axis. The rotor unit comprises a rotor core and at least one permanent magnet, the rotor core having an outer diameter that is smaller than an inner diameter of said stator core.

BACKGROUND OF THE INVENTION AND PRIOR ART

It is since long known that in, above all, the mounting of electrical motors comprising permanent magnets, the risk of the operator and/or the electrical motor being injured/damaged is imminent as a consequence of the large magnetic forces acting between the stator and rotor of the motor during mounting.

A known way to mount a submersible machine, for instance a pump for waste water, comprising an electrical motor that does not comprise permanent magnets includes the following steps. First, the pump housing, or the stator housing, is placed upside-down on a plane and stable surface. Next, the stator is mounted in the stator housing, which together form a stator unit. Next, the mounting of the rotor unit (drive shaft, rotor, bearing, and bearing housing) to the stator unit is carried out by having the rotor unit lowered into the stator unit, by means of a crane, or manually, and the guiding of the rotor unit in the transverse direction is made by hand, until the drive shaft and upper drive shaft bearing are in contact with the stator housing, i.e., until the fully mounted position is reached. Next, the oil housing and the hydraulic unit are mounted. It should be pointed out that many service workshops are not equipped with more sophisticated equipment than a crane and different hand tools.

However, it has become more and more common that submersible machines comprise electrical motors comprising permanent magnets, and this entails that the mounting and the dismounting will be cumbersome, or even impossible, as a consequence of the omnipresent and invisible magnetic attraction between the rotor core and the stator unit.

If the above-mentioned mounting steps are carried out on a pump having an electrical motor comprising permanent magnets, the mixer as well as the operator risk being damaged/injured; moreover it is doubtful if the mounting at all will be successful. The mounting begins with the stator unit placed on a plane surface. When the rotor unit comprising permanent magnets after that is lowered, by means of a crane or the like, and at a point immediately above the stator, the magnetic attraction is so strong that the stator unit will be lifted from the surface, whereupon the stator unit may fall down and risk being damaged and simultaneously risk injuring the operator.

Theoretically, the stator unit can be clamped to the support to prevent the same from being lifted when lowering the rotor unit. However, the rotor unit can still not be centred above the stator, but will uncontrollably swing until the rotor contacts and abuttingly adheres to the stator unit. The only applicable method in a service workshop to solve the centring of the rotor unit is then to knock on the rotor unit using a hammer until the same is centred. However, this method is not recommendable since the electrical motor, and above all the permanent magnets, risk being damaged.

Even if the operator manages to centre and insert the rotor unit into the stator unit, the next risk arises in that the rotor unit in a literal sense will be sucked into the stator unit by great force and a cutting action will arise between the stator housing and the bearing housing of the rotor unit, whereby the operator risks hurting or losing his/her fingers.

U.S. Pat. No. 6,919,659 B2 discloses a method for the mounting of a stator on a rotor unit comprising at least one permanent magnet. The disclosed method overcomes the problem of the stator contacting the rotor. The rotor is arranged in a plastic casing that is pressed into the stator during the mounting.

US 2007/0235248 A1 describes a method for the mounting of a stator on a rotor unit comprising permanent magnets. The described method overcomes the problem of the stator contacting the rotor. The method uses an outer casing that is fixedly connected to the rotor unit, and then the stator unit is lowered into the gap between the outer casing and the rotor. Thus, the method uses the outer casing as a guidance for the stator unit.

Neither of these documents provides a method that solves all problems associated with the mounting of an electrical motor comprising permanent magnets.

BRIEF DESCRIPTION OF OBJECTS AND FEATURES OF THE INVENTION

The present invention aims at obviating the above-mentioned disadvantages and failings of previously known electrical motors and at providing an improved electrical motor. A primary object of the invention is to provide an improved electrical motor of the type defined by way of introduction, the mutual motion of the included parts being limited during mounting/dismounting of the same at the same time as the mutual motion of the included parts being not limited when the electrical motor is in the mounted state.

It is also an object of the present invention to provide an electrical motor that does not require expensive or complicated service equipment to enable mounting/dismounting.

It is also an object of the present invention to provide an electrical motor in which the rotor does not risk scraping against the inside of the stator during mounting/dismounting.

BRIEF DESCRIPTION OF THE FEATURES OF THE INVENTION

According to the invention, at least the primary object is achieved by means of the electrical motor defined by way of introduction, which is characterized in that the rotor unit comprises a brake means, the radially outer surface of which is inscribed on a circle having a diameter that is greater than the outer diameter of the rotor core, at least the outer surface of the brake means being manufactured from rubber, and at least a part of the brake means being arranged to abut against an inner surface of the stator core upon mutual axial displacement of the rotor unit and the stator unit, and the brake means being arranged spaced-apart from the stator core when the rotor unit is in the mounted state in the stator unit.

Preferred embodiments of the present invention are furthermore defined in the depending claims.

Preferably, the rotor unit comprises a first short-circuiting ring, the brake means being connected to said short-circuiting ring. This entails that just a small redesign of a conventional electrical motor is required to provide the present invention.

In a preferred embodiment, the brake means comprises at least one circular element, which entails that the greatest possible braking effect is obtained during mounting at the same time as the smallest possible compression of the brake means is required.

Additional advantages and features of the invention will be apparent by the other dependent claims as well as in the following, detailed description of preferred embodiments.

BRIEF DESCRIPTION OF THE DRAWINGS

A more complete understanding of the above-mentioned and other features and advantages of the present invention will be clear from the following, detailed description of preferred embodiments, reference being made to the accompanying drawings, wherein.

DETAILED DESCRIPTION OF PREFERRED EMBODIMENTS

Figure 1:
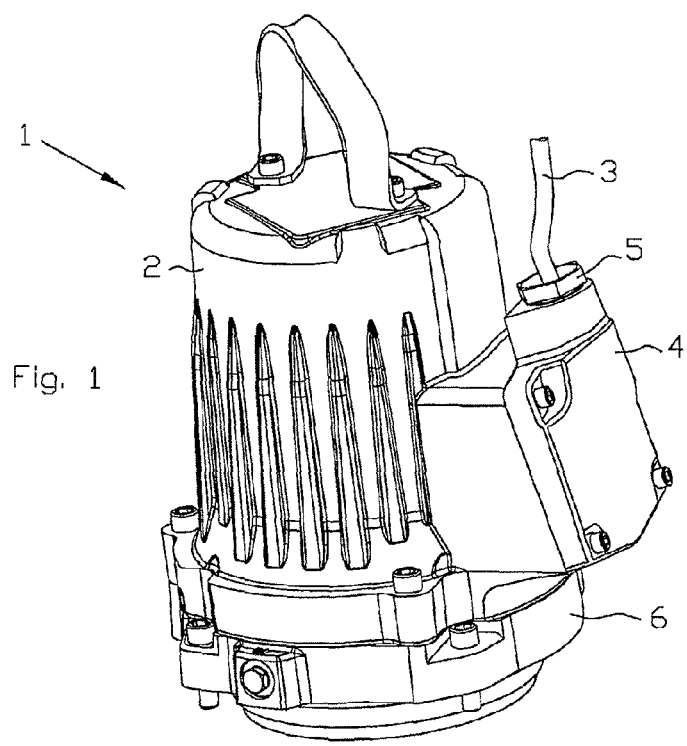
FIG. 1 is a perspective view of a part of a submersible machine, realised by means of a pump in which the hydraulic unit is removed.

The present invention relates generally to electrical motors for submersible machines, such as pumps and mixers for, for instance, water and waste water. It should be pointed out that said submersible machines in addition to being immersed in liquid also may be set up in a dry or semidry way. In FIG. 1, such a pump is shown, and in FIG. 2, such a mixer is shown.

Reference is initially made to FIGS. 1, 3-6, in which a pump is shown, generally designated 1. It should be pointed out that the electrical motor according to the invention hereinafter is described in the context of such a pump if nothing else is mentioned, but it should be realized that the present general idea of the invention that forms the basis of the description below is not limited to such a pump.

The pump 1 comprises a housing 2, also known as stator housing, which may comprise an internal cooling system for the pump 1, alternatively the pump may be arranged to be cooled by means of the liquid surrounding the same during operation via the housing 2. The primary purpose of the housing 2 is, however, to accommodate the driving unit/electrical motor of the pump 1, which will be described in more detail below. The pump 1 obtains power supply via a power cable 3 leading into a coupling unit 4 via a cable lead-through 5. At the bottom in FIG. 1, an oil housing bottom 6 is shown connected to the housing 2, and in addition, the pump also comprises a hydraulic unit in connection with the oil housing bottom 6, however the hydraulic unit is omitted in FIG. 1.

Reference is now made to FIGS. 3-6. The present invention is aimed at an electrical motor, generally designated 7, which comprises a stator unit, generally designated 8, and a rotor unit, generally designated 9. The rotor unit 9 has an axially extending centre axis and is, in the mounted state, rotatably arranged in the stator unit 8.

In the embodiment shown, the stator unit 8 comprises said housing 2 as well as a stator, which in turn comprises a stator core 10, lower winding coils 11 and upper winding coils 12. Preferably, the stator core 10 comprises a number of ring-shaped stator plates piled on each other, which are manufactured from a magnetic material, for instance a metal such as iron. The pile of stator plates comprises a number of axially extending teeth, which project inward and are separated from each other by means of stator slots. Furthermore, a stator winding is arranged in the stator slots in a conventional way, and is connected by means of said lower winding coils 11 and said upper winding coils 12 in such a way that a magnetic field will rotate in the stator core 10 about said centre axis when the pump, more precisely the stator winding, is connected to the mains and is activated.

In the embodiment shown, the rotor unit 9 comprises a drive shaft 13 and a rotor, which in turn comprises a rotor core 14, a lower short-circuiting ring 15, and an upper short-circuiting ring 16. It should be pointed out that the lower short-circuiting ring 15 and the upper short-circuiting ring 16 are only found in certain types of electrical motors, and in those cases the rotor unit 9 lacks such short-circuiting rings, preferably the rotor unit 9 comprises an individual element instead of the upper short-circuiting ring, as will be described below. The rotor core 14 may be a pile of several rotor plates, or may be cast in one piece, and shall be manufactured from a magnetic material, for instance metal such as iron. Furthermore, the rotor core 14 shall comprise at least one permanent magnet, in order to form at least two poles of the rotor, preferably the rotor core 14 comprises a plurality of permanent magnets with the purpose of, in a conventional way, obtaining several poles and thereby a slower speed of rotation at a specific current feed frequency. It should also be pointed out that the rotor core 14 may comprise several permanent magnets per pole. The permanent magnets are preferably arranged at or near the envelope surface of the rotor core 14.

In one embodiment (not shown), the rotor is a so-called hybrid rotor comprising a ring-shaped, radially outer section of an asynchronous type and a ring-shaped, radially inner section of a synchronous type arranged radially inside said outer section, the inner section of a synchronous type comprising said at least one permanent magnet. The ring-shaped outer section of an asynchronous type is arranged to be active only at start of the electrical motor and the ring-shaped inner section of a synchronous type is arranged to be positively activated after the hybrid rotor having obtained a rotary motion and during the subsequent normal operation.

According to the present invention, the rotor core 14 shall have an outer diameter $d_r$ that is smaller than an inner diameter $d_s$ of said stator core 10, whereupon a narrow circumferential cylindrical gap is obtained between the rotor core 14 and the stator core 10, which gap preferably is gas-filled. Thereby, there is no friction between the rotor unit 9 and the stator unit 8 during operation of the electrical motor except possible friction in bearings, and there is no direct or indirect abutment between the rotor core 14 and the stator core 10.

According to the present invention, the rotor unit 9 comprises furthermore a brake means 17, which, according to a preferred embodiment, is situated above the rotor core 14 as viewed in the axial direction. At least a part of the outer surface of the brake means 17, as viewed in the radial direction, is inscribed on a circle having a diameter $d_b$ that is greater than the outer diameter $d_r$ of the rotor core 14. Furthermore, at least a part of the brake means 17 is arranged to abut against an inner surface 18 of the stator core 10 during mounting/dismounting of the rotor unit 9 in the stator unit 8, see FIG. 4, at the same time as the brake means 17 is arranged spaced-apart from the stator core 10 when the rotor unit 9 is in the mounted state in the stator unit 8, see FIGS. 5 and 6. More precisely, the brake means is 17 preferably axially spaced-apart from the stator core 10 by being situated above the stator core 10 when the electrical motor is mounted, and thereby the brake means 17 is only active during mounting/dismounting and does not affect the electrical motor negatively during normal operation. In order to guarantee that the brake means 17 abuts against the inner surface 18 of the stator core 10 during mounting/dismounting, the brake means 17 should accordingly have a certain compressibility, and in the unloaded state, the diameter $d_b$ of the circle on which the outer surface of the brake means 17 is inscribed shall preferably be greater than the inner diameter $d_s$ of the stator core 10, in an alternative embodiment, the diameter $d_b$ of the circle is as large as the inner diameter $d_s$ of the stator core 10.

According to an alternative embodiment (not shown), the brake means 17 is arranged radially projecting from the rotor core 14 and the drive shaft 13 during mounting/dismounting, whereupon the brake means 17 by means of a suitable mechanical arrangement (not shown) is brought to be displaced radially inward into the rotor core 14 when the electrical motor is in the mounted state. Thereby, the brake means 17 being arranged radially spaced-apart from the stator core 10 when the rotor unit 9 is in the mounted state in the stator unit 8.

According to the shown embodiment of the invention, the brake means 17 is connected to the upper short-circuiting ring 16 of the rotor unit 9. However, it should be pointed out that the brake means 17 does not need to be arranged in a short-circuiting ring or the like, but may be connected to an individual element (not shown), which in turn is connected to the drive shaft 13 and/or the rotor, axially above the rotor core, or be connected to the upper part of the rotor core 14, and that these equivalents are considered included in the description above and below even if they are not explicitly mentioned.

It is preferred that the brake means 17 comprises at least one circular element, such as an o-ring or a band, and that the upper short-circuiting ring 16, the individual element or the upper part of the rotor core 14 has a circumferential groove, or seat, in which the brake means 17 is arranged.

Preferably, the circumferential groove, or the seat, is circular. Preferably, circumferential abutment occurs between the brake means 17 and the inner surface 18 of the stator core 10 during mounting/dismounting. In an alternative embodiment, the brake means 17 comprises several circular elements axially separated from each other, or the brake element has a large axial extension, with the purpose of obtaining a mutual guidance of the rotor unit 9 and the stator unit 8 during mounting/dismounting. Preferably, at least the outer surface of the brake means 17, i.e., the surface that abuts against the inner surface 18 of the stator core 10 during mounting/dismounting, is manufactured from rubber in order to obtain a good braking effect. However, it should be pointed out that the brake means may be manufactured from plastic, consist of a spring steel ring, etc.

In an alternative embodiment, the brake means 17 comprises at least three separate elements, which preferably are equidistantly distributed along the circle on which the outer surface of the brake means is inscribed.

In addition to offering a controllable mounting/dismounting, the brake means 17 also imparts a centring effect, which entails that the stator core 10 and the rotor core 14 do not scrape against each other during mounting/dismounting.

Figure 3:
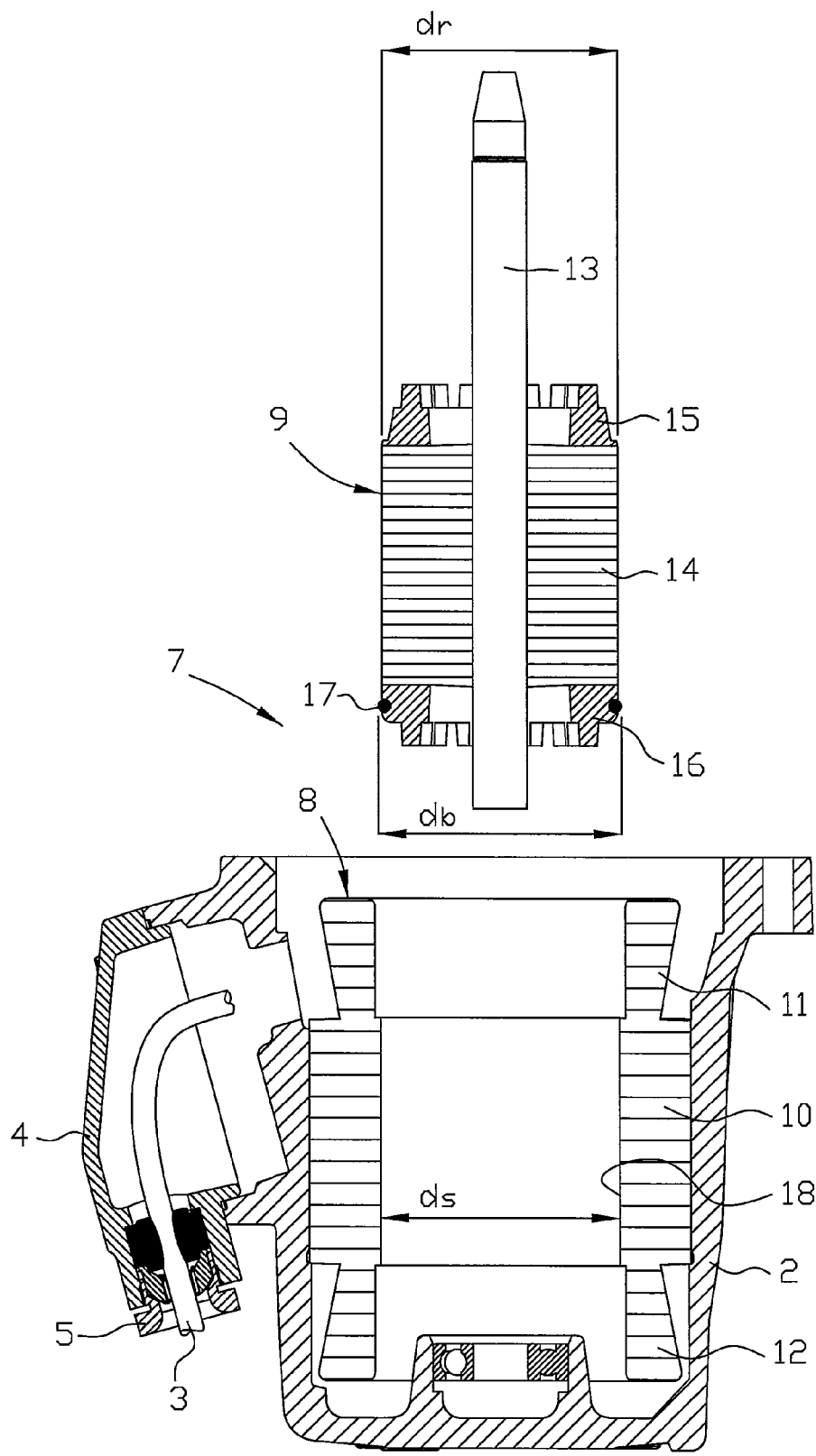
FIG. 3 is a schematic sectioned view of a pump, comprising a stator unit and a rotor unit according to the present invention, in an unmounted state.
Figure 4:
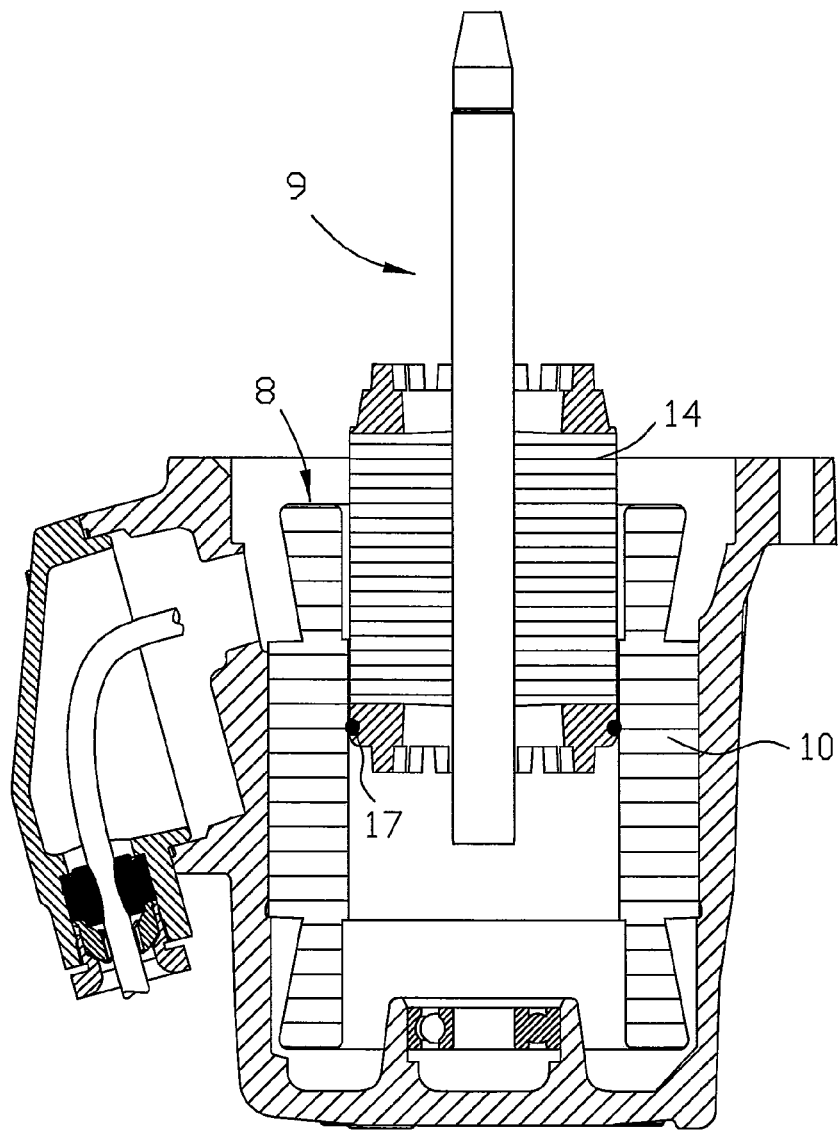
FIG. 4 is a schematic sectioned view of the pump according to FIG. 3 during mounting.
Figure 5:
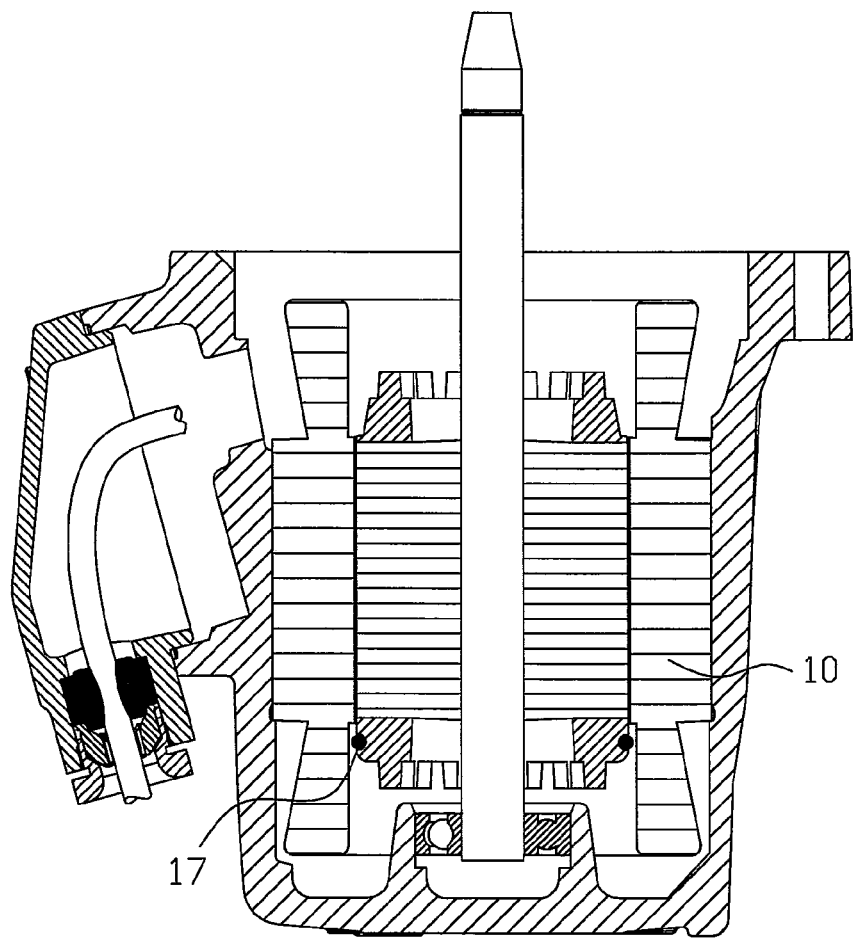
FIG. 5 is a schematic sectioned view of the pump according to FIGS. 3 and 4 in a mounted state.
Figure 6:
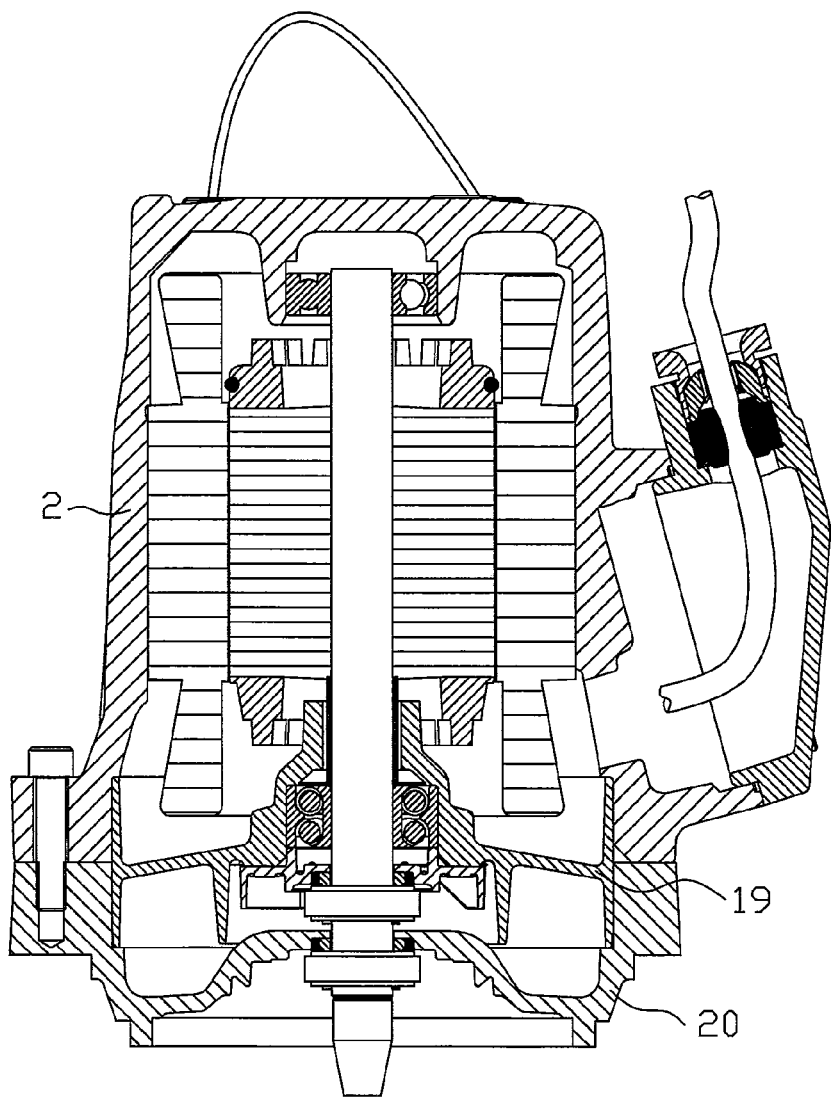
FIG. 6 is a schematic sectioned view of the submersible machine shown in FIG. 1.

In FIG. 6, a bearing housing 19 and an oil housing bottom 20, with the appurtenant bearings and axial face seals, are also connected to the housing 2, whereupon the shown pump assembly is ready to receive the omitted hydraulic unit in a conventional way. It should be pointed out that the bearing housing 19 with the appurtenant bearings, in an alternative embodiment, belongs to the rotor unit 9 during mounting/dismounting and is mounted to the drive shaft 13 before the mounting of the rotor unit 9 in the stator unit 8. The upper bearing, which in FIGS. 3 and 4 is shown arranged in a bearing seat in the housing 2, may in an alternative embodiment be connected to the drive shaft 13 and be mounted together with the rotor unit 9 in the stator unit 8. In a further alternative embodiment, the drive shaft 13 and the bearing housing 19 are mounted after the rotor core having been mounted in the stator unit. However, the embodiments described in this paragraph do not affect the present invention that is defined by the independent claim.

Figure 2:
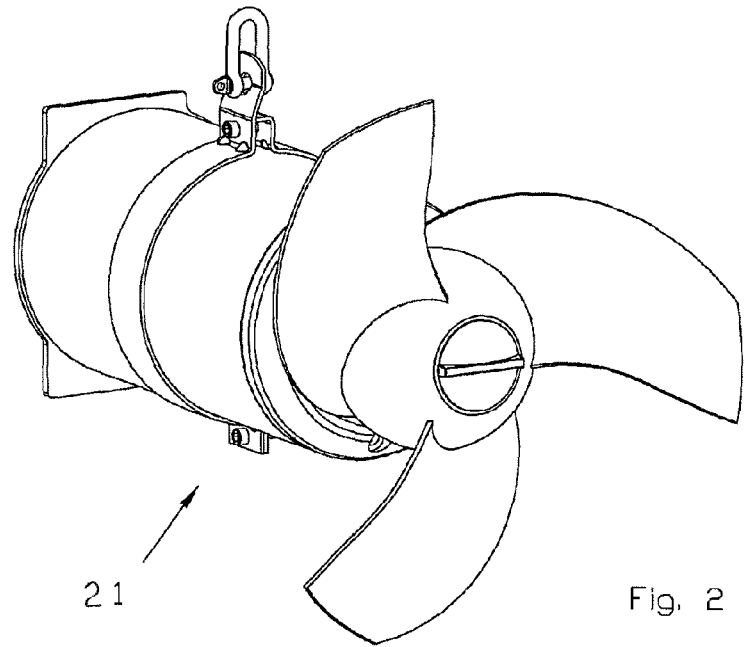
FIG. 2 is a perspective view of a submersible machine, realised by means of a mixer.
Figures 7, 8:
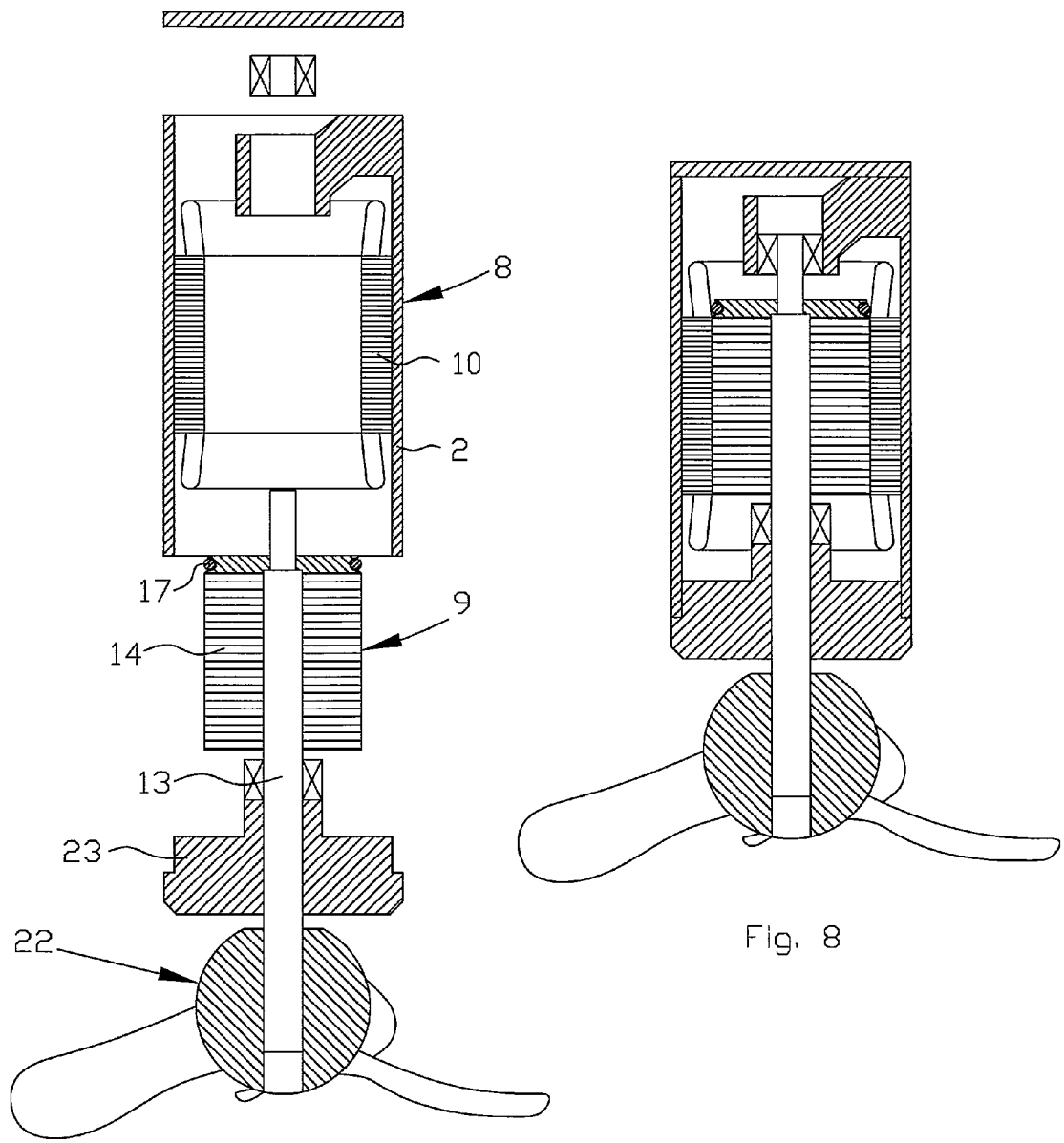
FIG. 7 is a schematic sectioned view of a mixer, comprising a stator unit and a rotor unit according to the present invention, in an unmounted state.
FIG. 8 is a schematic sectioned view of the mixer of FIG. 7 in the mounted state.

Reference is now made to FIGS. 2, 7-8, in which a submersible machine is shown in the form of a mixer 21 intended for generating and maintaining a motion in a liquid volume, for instance water or waste water.

The mixer 21 comprises an electrical motor and a drive shaft 13 extending from said electrical motor to a propeller 22, i.e., the propeller 22 is attached to the lower end of the drive shaft 13. The propeller 22 comprises a hub and one or more blades extending from said hub and being evenly distributed along the circumference of said hub. In operation, the propeller 22 is driven by the electrical motor for rotation about a propeller axis in order to generate a liquid flow from a suction side to a pressure side of the propeller 22. Furthermore, the mixer 21 comprises an oil housing and a bearing housing, shown as a schematic part at 23, a rotor unit 9 comprising a rotor core 14 and said drive shaft 13, and a stator unit 8 comprising a stator core 10 and a housing 2. The rotor core 14 comprises at least one permanent magnet. It should be pointed out that several parts and details of the mixer have been removed for the sake of clarity, and the parts shown are only schematically shown and are not represented true to scale. Furthermore, the rotor unit 9 comprises a brake means 17 arranged above the rotor core 14, or in the upper area of the rotor core 14.

Upon mounting of such a mixer 21, the propeller is placed upside-down on a plane and stable surface, and after that the oil housing and the bearing housing are mounted to the propeller. Next, attachment of the rotor unit 9 (drive shaft and rotor) to the propeller 22 is made so that the drive shaft is in an upright position by guiding the lower end of the drive shaft through the oil housing and the bearing housing and attaching said lower end of the drive shaft to the propeller. Finally, the stator unit 8 (stator and stator housing), alternatively only the stator, is lowered over the rotor unit 9, until the lower end of the stator housing is in contact with the oil housing, i.e., until the fully mounted position is reached, see FIG. 8. During lowering of the stator unit 8, the brake means 17 will abut against the inner surface of the rotor core 10 as described above in connection with FIGS. 1, 3-6.

Feasible Modifications of the Invention

The invention is not limited only to the embodiments described above and shown in the drawings, which only have the purpose of illustrating and exemplifying. This patent application is intended to cover all adaptations and variants of the preferred embodiments described herein, and consequently the present invention is defined by the wording of the accompanying claims and the equivalents thereof. Thus, the equipment may be modified in all feasible ways within the scope of the accompanying claims.

It should be pointed out that, according to the invention, it does not matter if it is the stator that is lowered over the rotor or if it is the rotor that is lowered into the stator, the main thing is that a mutual axial motion takes place.

It should also be pointed out that all information about/regarding terms such as upper, under, etc., should be interpreted/read with the equipment oriented in accordance with FIGS. 1, 5, 7 and 8, with the drawings oriented in such a way that the reference designations can be read in a correct way. Thus, such terms only indicate mutual relationships in the shown embodiments, which relationships may be changed if the equipment according to the invention is provided with another construction/design.

It should be pointed out that even if it is not explicitly mentioned that features from one specific embodiment can be combined with the features of another embodiment, this should be regarded as evident when possible.

The invention claimed is:

1. An electrical motor for a submersible machine, comprising a stator unit having a stator core, and a rotor unit rotatably arranged in said stator unit and having an axially extending center axis,
    the rotor unit comprising a rotor core and at least one permanent magnet, the rotor core having an outer diameter that is smaller than an inner diameter of said stator core,
    the rotor unit comprising a brake means, the radially outer surface of the brake means inscribed on a circle having a diameter greater than the outer diameter of the rotor core, and, in an unloaded state of the brake means, equal to or greater than the inner diameter of the stator core,
    at least the outer surface of the brake means composed of rubber, and at least a part of the brake means arranged to abut against an inner surface of the stator core upon mutual axial displacement of the rotor unit and the stator unit, and
    in a mounted state of the rotor unit in the stator unit, the brake means spaced apart from the stator core and positioned in a recessed region of the rotor core.

2. The electrical motor according to claim 1, wherein the rotor unit comprises an upper short-circuiting ring, and the brake means is connected to said upper short-circuiting ring.

3. The electrical motor according to claim 2, wherein the upper short-circuiting ring includes the recessed region, the recessed region comprising a circumferential groove.

4. The electrical motor according to claim 1, wherein the brake means comprises at least one circular element.

5. The electrical motor according to claim 1, wherein the brake means comprises at least three separate elements.

6. The electrical motor according to claim 5, wherein said three separate elements are equidistantly distributed along the circle on which the outer surface of the brake means is inscribed.

7. The electrical motor according to claim 1, said brake means configured to deform against the inner surface of the stator core upon mounting the rotor core in the stator core.

8. The electrical motor according to claim 1, wherein said brake means overlaps the stator unit in an axial direction when the rotor unit is in the mounted state in the stator unit.

* * * * *